United States Patent [19]

Schneider et al.

[11] Patent Number: 4,673,249

[45] Date of Patent: Jun. 16, 1987

[54] DRIVE FOR A PRISMATIC COMPENSATOR

[75] Inventors: Horst Schneider, Königsbronn; Wilhelm Schmidt, Rainau-Buch; Erwin Daniels, Aalen, all of Fed. Rep. of Germany

[73] Assignee: Carl-Zeiss-Stiftung, Heidenheim, Fed. Rep. of Germany

[21] Appl. No.: 742,571

[22] Filed: Jun. 7, 1985

[30] Foreign Application Priority Data

Jul. 14, 1984 [DE] Fed. Rep. of Germany ....... 3425971

[51] Int. Cl.⁴ ............................................... G02B 7/18
[52] U.S. Cl. .................................................. 350/287
[58] Field of Search ............... 350/286, 287, 447, 484, 350/567

[56] References Cited

U.S. PATENT DOCUMENTS

| 1,680,534 | 1/1928 | Garbutt et al. | 350/287 |
| 2,458,831 | 1/1949 | Cady | 350/447 |
| 3,297,395 | 1/1967 | Dardarian | 350/484 |

Primary Examiner—John K. Corbin
Assistant Examiner—V. Lemmo
Attorney, Agent, or Firm—Walter Ottesen

[57] ABSTRACT

Two prismatic wedges of a prismatic compensator are rotated in opposite directions by the same angular quantity for adjusting the prismatic effect with the aid of a crossed-over pull wire. The pull wire is changed in direction by means of two rollers. The pull wire encloses the fittings under pulling tension so as to be free of slippage and free of play.

7 Claims, 4 Drawing Figures

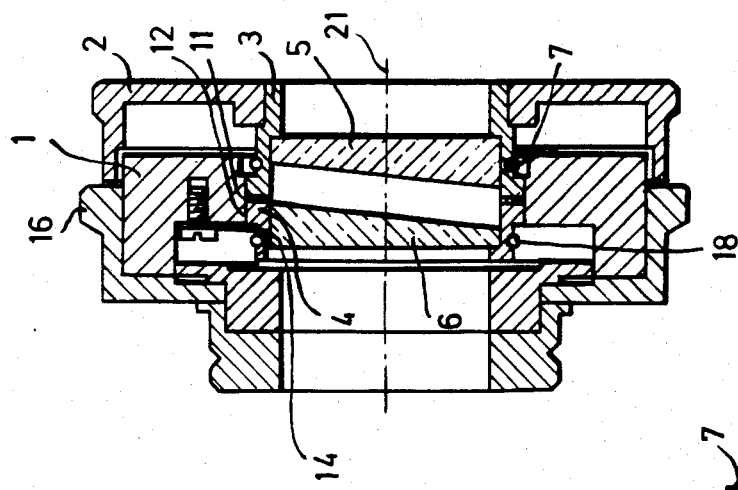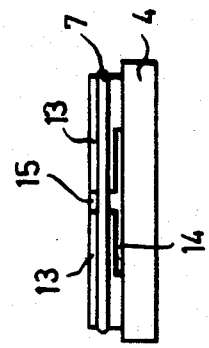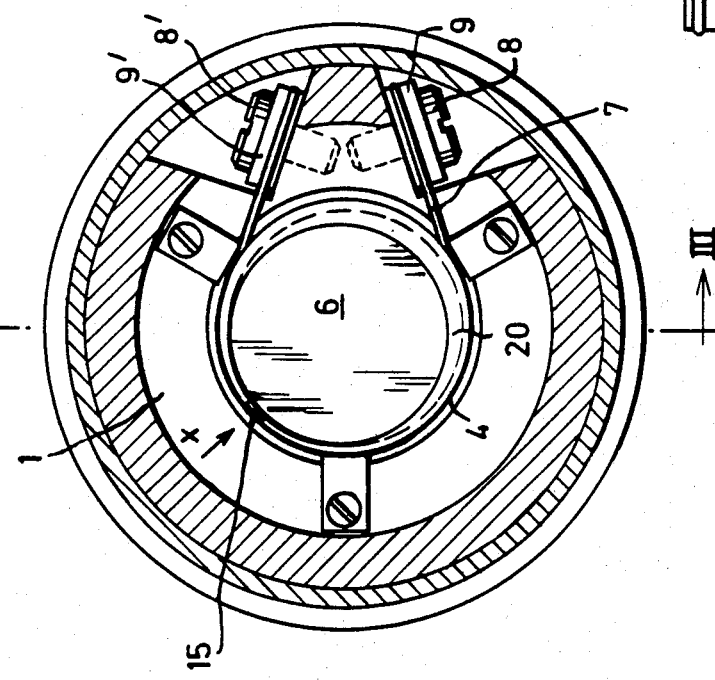

4,673,249

DRIVE FOR A PRISMATIC COMPENSATOR

FIELD OF THE INVENTION

The invention relates to a drive for the prismatic wedges of a prismatic compensator which are mounted in respective fittings.

BACKGROUND OF THE INVENTION

Prismatic compensators are utilized in vertex refractometry to compensate for the prismatic effect of spectacle lenses. Such a compensation is necessary when measuring spectacle lenses having a prismatic effect. The compensation affords the advantage that it makes the measurement of astigmatic lenses easier.

Prismatic compensators include two wedge-shaped prisms (rotating prisms) which are utilized for determining the prismatic effect of the spectacle lenses to be measured and which are rotated through the same angle amounts in mutually opposite directions. The base position is determined by conjointly rotating the two rotating prisms.

In prismatic compensators of the state-of-the-art, the two rotating prisms are mounted in separate fittings. Each of these fittings is provided with a toothed rim at its outer periphery and both fittings are rotatable about a common axis. A spur gear or conical gear meshes with the two toothed rims and is rotatable by means of a rotatable knob. In this way, the toothed rims and therefore the rotating prisms are rotated in mutually opposite directions by the same angular amounts.

However, in spite of very precise manufacture of the known toothed rims, pitch errors occur during the assembly of the prismatic compensator when one of the toothed rims is brought into engagement with the other toothed rim via the conical gear or spur gear. Such a pitch error can only be corrected by a complex alignment of the toothed rims with respect to each other.

Furthermore, the play between the conical gear or the spur gear and the toothed rims can have a disruptive and falsifying angle variation even when a pitch error is corrected.

The spur gear and the toothed rims are expensive because of the required precision and require a great deal of space as well as being heavy when compared to the remaining components.

SUMMARY OF THE INVENTION

It is an object of the invention to provide a drive for a prismatic compensator wherein the two prismatic wedges thereof rotate in mutually opposite directions by the same angular amount without slippage and without play. It is a further object of the invention to provide a prismatic compensator having a drive arrangement which is compact and of simple configuration.

The drive according to the invention includes the characteristic that the rotational movement which the operator applies to the outer actuating ring at the periphery of the prismatic compensator is transmitted directly to one of the two fittings for accommodating a prismatic wedge and effects simultaneous rotational movements of both rotating wedges by the same angular amounts.

The freedom from slippage and play of the wire drive is obtained in that the wire of the wire drive is fastened at both its ends on one of the two fittings and, on the other hand, that the wall of the fitting defining the guide path for the wire on the other fitting is cut and opened over a small region of the periphery so that the wire which is mounted under tension presses the resilient projections together. In this way, an adequate pull tension of the pull wire is ensured even in the presence of small linear expansions of the pull wire.

In addition to freedom from slippage and play, the drive of the prismatic compensator according to the invention affords the advantage that pitch errors which would otherwise occur during the assembly of the prismatic compensator no longer occur and that the entire assembly utilizes fewer components and is therefore simple to manufacture as well as being light in weight and compact in its configuration.

In addition to the described driving of two prismatic wedges rotating in mutually opposite directions the drive of the invention can be used to drive two slit diaphragms movable in mutually opposite directions or polarization filters.

BRIEF DESCRIPTION OF THE DRAWING

The invention will now be described with reference to the drawings wherein:

FIG. 2 is a plan view wherein the prismatic compensator of FIG. 1 has been opened to show how the pull wire is mounted and fastened;

FIG. 3 is a section view taken along line III—III of FIG. 2; and,

FIG. 4 is a view of the guide path of the pull wire viewed in the direction of the arrow X of FIG. 2.

DESCRIPTION OF THE PREFERRED EMBODIMENTS OF THE INVENTION

Figure 1:
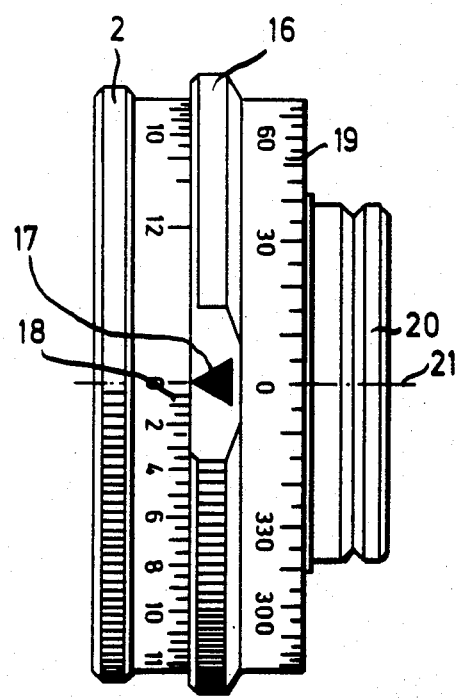
FIG. 1 is a side elevation view of a prismatic compensator equipped with a drive of the invention.

The prismatic compensator shown in FIG. 1 can be inserted into a vertex refractometer of conventional configuration by means of the connection piece 20. The mount of the prismatic compensator includes two rotatable rings 2, 16 configured as knurled rings. The prismatic effect is adjusted by rotating the ring 2 and is read off of scale 18 which cooperates with index 17. By rotating the ring 16, the base position is adjusted and its position is read from the TABO graduations of the scale 19.

As the section view of FIG. 3 shows, the prismatic compensator of FIG. 1 includes a first prismatic wedge 5 which is mounted in fitting 3 and a second prismatic wedge 6 which is mounted in fitting 4. The fittings 3, 4 and therewith the prismatic wedges 5, 6 are rotatable about a common axis 21. To adjust the prismatic effect, the prismatic wedges 5, 6 are rotated in opposite directions by the same angular amount by rotating the ring 2. To adjust the base position, the prismatic wedges 5, 6 are rotated in common by rotating the ring 16.

The actuating ring 2 is fixedly attached to the first fitting 3. One end of a wire 7 is mounted on the periphery of fitting 3. This wire 7 is placed in a groove on the outer periphery of fitting 3 and surrounds this fitting. Behind the fitting 3, the wire 7 is guided around a direction-changing roller 9 which is configured as a ball-bearing, and which has a diameter corresponding to the spacing of the ring grooves of the fittings 3, 4. Coming from the direction-changing roller 9, the wire 7 surrounds the second fitting 4 in a direction opposite to the direction in which the wire surrounds the fitting 3. After surrounding fitting 4, the wire 7 is guided via a second ball-bearing, direction-changing roller 9' back again to fitting 3 whereat the same is attached.

The directional-rollers 9, 9' are fastened to the cylindrical mounting block 1 by means of the threaded fasteners 8, 8'. The rollers 9, 9' are mounted on the block 1 so that the respective planes defined thereby conjointly form an acute angle. This permits the wire 7 to enclose the fittings 3 and 4 by more than one half of the respective peripheral surfaces thereof.

The mounting block 1 is rotatably mounted for rotation about the axis 21. When the knurled ring 16 is rotated, the mounting block 1 is likewise rotated and takes along the two fittings 3, 4 journalled therein so that the prismatic wedges 5, 6 are conjointly rotated.

The edge of the fitting 4 is opened up in a small region of its periphery at the location designated by arrow X in FIG. 2. This configuration is shown with more clarity in FIG. 4 where a horizontal cut 14 and a vertical separation 15 conjointly define two resilient tongue-like members 13 in the peripheral portion of the fitting 4. The two tongue-like members 13 are formed in a region of the peripheral portion whereat the wall thickness has been reduced and the peripheral portion is formed by an eccentric working of the fitting 4. The wire 7 is mounted under pulling tension and presses the tongue-like members 13 inwardly. The resulting counterforce of the resilient tongue-like members 13 ensures a permanent tension of the pull wire during the entire rotational movement of the fitting 4. The opening at the location indicated by arrow X is in the region of the periphery of the fitting 4 which is tightly surrounded by the pull wire 7 during the entire rotational movement.

Therefore, the wire 7 is guided about both fittings 3, 4 under pulling tension. In this way, it is assured that the fittings 3, 4 will rotate without slippage and without play when the actuating ring 2 is rotated, the rotation being simultaneous and in opposite directions to each other by an exact same angular quantity. The rotational friction of the fittings 3, 4 with respect to each other is held to be as small as possible by means of a friction-reducing material 11 which can, for example, be a ring made of TEFLON.

It is understood that the foregoing description is that of the preferred embodiments of the invention and that various changes and modifications may be made thereto without departing from the spirit and scope of the invention as defined in the appended claims.

What is claimed is:

1. A drive for the two prismatic wedges of a prismatic compensator, the drive comprising:
    two fittings for accommodating corresponding ones of the prismatic wedges;
    mounting means for mounting said fittings so as to be rotatable about a common axis;
    a pull wire mounted on the periphery of one of said fittings so as to surround the same in a first direction of rotation about said axis and on the periphery of the other one of said fittings so as to surround the same in a second direction of rotation about said axis which is opposite to said first direction of rotation, said wire being mounted under pull tension so as to cause the other one of said fittings to rotate through a predetermined angle about said axis in said second direction when said one fitting is rotated about said axis through said angle in said first direction; and,
    actuating means operatively connected to said one fitting for rotating the same about said axis.

2. The drive of claim 1, said actuating means being an outer ring fixedly attached to said one fitting.

3. A drive for the two prismatic wedges of a prismatic compensator, the drive comprising:
    two fittings for accommodating corresponding ones of the prismatic wedges;
    mounting means for mounting said fittings so as to be rotatable about a common axis;
    torque transmitting means for transmitting torque from one of said fittings to the other one of said fittings, said torque transmitting means including a pull wire interconnecting said fittings for transmitting said torque; and, pulley means for changing the direction of movement of said wire and for passing the same from said one fitting to said other fitting so as to cause said other fitting to rotate through a predetermined angle about said axis in a direction opposite to the direction of rotation of said one fitting when the latter is rotated through said angle about said axis; and,
    actuating means operatively connected to said one fitting for rotating the same about said axis.

4. The drive of claim 3, comprising tension means for imparting a pull tension to said wire so as to cause the latter to be in form-tight engagement with said fittings thereby eliminating slippage between said wire and said fittings.

5. The drive of claim 4, said pulley means including a first direction-changing roller for passing said wire from said one fitting to said other fitting while at the same time changing the direction of movement thereof; and, a second direction-changing roller for passing said wire from said other fitting back to said one fitting while at the same time changing the direction of movement thereof;
    said wire being guided over said one fitting and then to and over said first roller whereafter the wire is guided over said other fitting and then to and over said second roller and back to said one fitting; and,
    said pull wire being attached to said one fitting in a form-tight manner.

6. The drive of claim 5, said other fitting having a rim-like wall portion defining a path for accommodating said wire thereon, said tension means including two resilient tongue-like members formed in said rim for pushing outwardly against said wire to impart a pull tension force thereto.

7. The drive of claim 6, said mounting means including a mounting piece and a cylindrical component rotatably mounted in said mounting piece for accommodating said fittings; and, said drive further comprising an outer actuating ring for rotating said cylindrical component to set the base position of said prismatic wedges.

* * * * *